United States Patent
Pamulaparthy et al.

(10) Patent No.: US 12,271,171 B2
(45) Date of Patent: Apr. 8, 2025

(54) SYSTEMS AND METHODS FOR INTEGRATED CONDITION MONITORING FOR POWER SYSTEM ASSET HEALTH SCORING

(71) Applicant: General Electric Technology GmbH, Baden (CH)

(72) Inventors: Balakrishna Pamulaparthy, Hyderabad (IN); Mitalkumar Kanabar, Markham (CA); Austin Byrne, Belfast (GB); Umar Naseem Khan, Port Elgin (CA)

(73) Assignee: GE Infrastructure Technology LLC, Greenville, SC (US)

( * ) Notice: Subject to any disclaimer, the term of this patent is extended or adjusted under 35 U.S.C. 154(b) by 543 days.

(21) Appl. No.: 17/666,237

(22) Filed: Feb. 7, 2022

(65) Prior Publication Data

US 2023/0221693 A1 Jul. 13, 2023

Related U.S. Application Data

(60) Provisional application No. 63/298,201, filed on Jan. 10, 2022.

(51) Int. Cl.
G05B 19/042 (2006.01)

(52) U.S. Cl.
CPC .. *G05B 19/0428* (2013.01); *G05B 2219/2639* (2013.01)

(58) Field of Classification Search
CPC .............................................. G05B 2219/2639
(Continued)

(56) References Cited

U.S. PATENT DOCUMENTS

| | | |
|---|---|---|
| 10,991,169 B2 | 4/2021 | Tonet et al. |
| 2016/0153806 A1* | 6/2016 | Ciasulli ................ G07C 5/0825 702/183 |

(Continued)

FOREIGN PATENT DOCUMENTS

| | | |
|---|---|---|
| CN | 112615436 A1 | 4/2021 |
| EP | 3299919 B1 | 7/2019 |

(Continued)

OTHER PUBLICATIONS

Extended European Search Report issued in EP Application No. 23150851.6 dated May 17, 2023, 12 pages.

*Primary Examiner* — Jigneshkumar C Patel
(74) *Attorney, Agent, or Firm* — Eversheds Sutherland (US) LLP

(57) ABSTRACT

Systems and methods are disclosed for asset health assessment and fleet management. An example method may include classifying a first power system asset into a first sub-system and a second sub-system. The example method may also include measuring, by a processor of a protection relay and from a first power system asset, electrical, thermal, and/or mechanical data associated with the first power system asset. The example method may also include identifying a first fault feature for the first sub-system, wherein the first fault feature is influenced by load oscillations in the first power system asset. The example method may also include comparing the first fault feature to a second fault feature of a third sub-system in a second power system asset, wherein the second fault feature is the same as the first fault feature, and wherein the second fault feature is not associated with load oscillations. The example method may also include adjusting a threshold value based on the comparison of the first fault feature to the second fault feature of the third sub-system. The example method may also include calculating, by the processor and for a first sub-system of the first power system asset, a first value based on the electrical, thermal, and/or mechanical data. The example method may also include calculating, by the processor, based on the first value, and using recent measurement data, a second value associated with the first sub-system. The example method may also include calculating, by the processor and using historical average data, a third value associated with the first sub-system. The example method may also include deter- (Continued)

mining, by the processor and based on the second value and the third value, a fourth value associated with the first power system asset. The example method may also include determining, by the processor, that the fourth value is greater than a threshold value. The example method may also include generating, by the processor, a warning based on the determination that the fourth value is greater than the threshold value.

20 Claims, 13 Drawing Sheets

(58) Field of Classification Search
USPC .......................................................... 700/292
See application file for complete search history.

(56) References Cited

U.S. PATENT DOCUMENTS

| | | |
|---|---|---|
| 2019/0122138 A1* | 4/2019 | Li ........................... G06Q 10/20 |
| 2019/0392360 A1* | 12/2019 | Kweon ............... G05B 23/0283 |
| 2020/0014208 A1 | 1/2020 | Bickel et al. |
| 2021/0064012 A1 | 3/2021 | Schweigert |
| 2021/0101916 A1 | 4/2021 | Akama et al. |
| 2021/0116504 A1 | 4/2021 | Ruan et al. |
| 2021/0123961 A1 | 4/2021 | Schmitz et al. |
| 2021/0256400 A1* | 8/2021 | Lin ........................ G01R 31/40 |

FOREIGN PATENT DOCUMENTS

| | | |
|---|---|---|
| EP | 3804066 A1 | 4/2021 |
| JP | 2018049609 A | 3/2018 |
| WO | 2016089792 A1 | 6/2016 |

* cited by examiner

FIG. 2

| Sub-System | Parameter | Alarm H Limit | Alarm HH Limit | Comments | IND | VFD | SM | Risk Contr. |
|---|---|---|---|---|---|---|---|---|
| Mechanical | Max Change in Mag dB @ k = 1 | Mech Fit PKP Stg 1 | Mech Fit PKP Stg 2 | | Yes | Yes | Yes | 4 |
| Mechanical | Max Change in Mag dB @ k = 2 | Mech Fit PKP Stg 1 | Mech Fit PKP Stg 2 | | Yes | Yes | Yes | 4 |
| Mechanical | Max Change in Mag dB @ k = 3 | Mech Fit PKP Stg 1 | Mech Fit PKP Stg 2 | | Yes | Yes | Yes | 4 |
| Mechanical | Max Change in Energy @ k = 1 | Mech Fit PKP Stg 1 | Mech Fit PKP Stg 2 | | Yes | Yes | Yes | 5 |
| Mechanical | Max Change in Energy @ k = 2 | Mech Fit PKP Stg 1 | Mech Fit PKP Stg 2 | | Yes | Yes | Yes | 5 |
| Mechanical | Max Change in Energy @ k = 3 | Mech Fit PKP Stg 1 | Mech Fit PKP Stg 2 | | Yes | Yes | Yes | 5 |

"The (copyright) owner has no objection to the facsimile reproduction by anyone of the patent document or the patent disclosure, as it appears in the Patent and Trademark Office patent file or records, but otherwise reserves all (copyright) rights whatsoever."

"The (copyright) owner has no objection to the facsimile reproduction by anyone of the patent document or the patent disclosure, as it appears in the Patent and Trademark Office patent file or records, but otherwise reserves all (copyright) rights whatsoever."

| Risk Index 2 --> /Risk Index 1 | 1 | 2 | 3 | 4 | 5 |
|---|---|---|---|---|---|
| 1 | 1 | 2 | 3 | 4 | 5 |
| 2 | 1 | 2 | 3 | 3 | 4 |
| 3 | 2 | 2 | 3 | 4 | 4 |
| 4 | 3 | 3 | 4 | 4 | 5 |
| 5 | 3 | 4 | 4 | 5 | 5 |

| Motor Wise | Supply | Load | Start | Bearing | Mechanical | Stator | Rator | Thermal |
|---|---|---|---|---|---|---|---|---|
| Subsystem Final Risk Index | 3 | 2 | 2 | 3 | 4 | 3 | 2 | 4 |
| Motor Wise Index = 5 | | | | | | | | |

FIG. 7

"The (copyright) owner has no objection to the facsimile reproduction by anyone of the patent document or the patent disclosure, as it appears in the Patent and Trademark Office patent file or records, but otherwise reserves all (copyright) rights whatsoever."

"The (copyright) owner has no objection to the facsimile reproduction by anyone of the patent document or the patent disclosure, as it appears in the Patent and Trademark Office patent file or records, but otherwise reserves all (copyright) rights whatsoever."

"The (copyright) owner has no objection to the facsimile reproduction by anyone of the patent document or the patent disclosure, as it appears in the Patent and Trademark Office patent file or records, but otherwise reserves all (copyright) rights whatsoever."

SYSTEMS AND METHODS FOR INTEGRATED CONDITION MONITORING FOR POWER SYSTEM ASSET HEALTH SCORING

RELATED APPLICATION

The present application claims priority to U.S. Provisional Ser. No. 63/298,201, titled "SYSTEMS AND METHODS FOR INTEGRATED CONDITION MONITORING FOR POWER SYSTEM ASSET HEALTH SCORING", filed Jan. 10, 2022, the contents of which are incorporated by reference.

FIELD OF DISCLOSURE

The present disclosure is related to power systems, and more particularly to systems and methods for integrated condition monitoring for power system asset health scoring.

BACKGROUND

Most industrial facilities have fleets of power system assets (such as motors, for example) running the processes ensuring the timely delivery of required tasks. When dealing with hundreds, if not thousands, of assets, the unknown must be managed, and when possible, assessed such that it becomes known. Proactive management of these power system assets within the fleet may be critical to ensure continuous, proper operation of the power system.

BRIEF DESCRIPTION OF THE DRAWINGS

The detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 2 depicts an example sub-system table, in accordance with one or more example embodiments of the disclosure.

FIG. 7 depicts an example score table, in accordance with one or more example embodiments of the disclosure.

DETAILED DESCRIPTION

Overview

Figure 1:
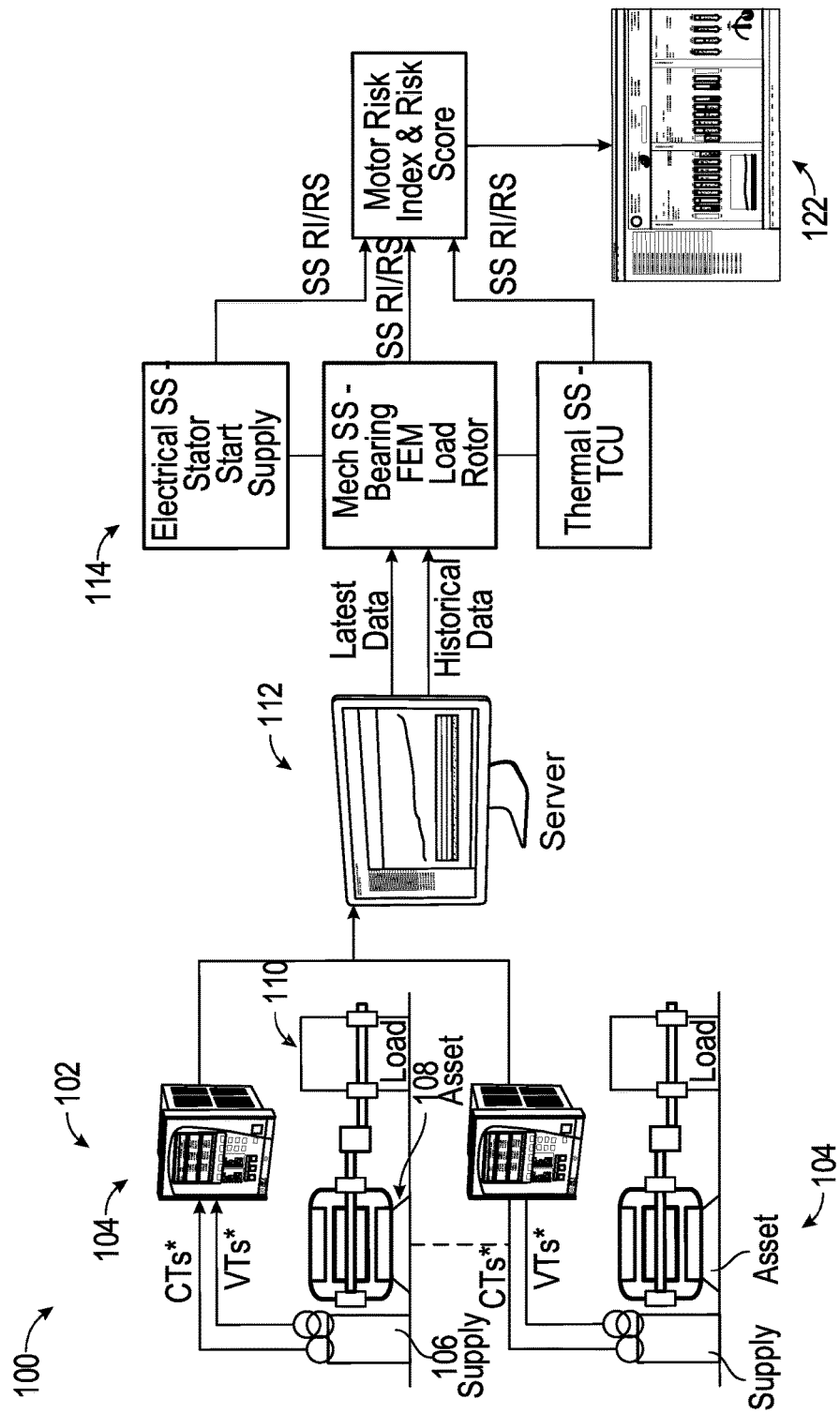
FIG. 1 depicts a schematic diagram of an example system, in accordance with one or more example embodiments of the disclosure.

This disclosure relates to, among other things, systems and methods for integrated condition monitoring for power system asset health scoring. Power systems assets (for example, rotating machines, such as induction or synchronous motors, and/or any other type of asset that may be included within a power system) are a critical component of many industrial processes and are frequently integrated in commercially available equipment. In some systems, the health condition of a power system asset (or a fleet of power system assets) may be effectively monitored using a non-intrusive method called Electrical Signature Analysis (ESA). ESA may involve treating the power system asset as an implicit transducer built into machine-driven equipment. The behavior of current associated with the power system asset can thus be used to show various health conditions of the machine as well as the load associated with the machine when the machine is active.

In one or more embodiments, the systems and methods described herein may improve upon current methods for power system asset health analysis by using a system that transitions users from a manual, one-on-one motor assessment process to an automated and online fleet management assessment. By evaluating the condition of assets and establishing their risk of failure, the system may be configured to prioritize and rank assets within a fleet. The system may also include an interface that provides customers with comprehensive motor fleet condition rankings, motor health information, and may also automatically trigger alarms associated with certain power system assets if certain health metrics cross pre-defined and adjustable threshold values. This may mitigate time-consuming and costly manual processes as well as unnecessary maintenance, helping focus capital and reduce operational expenses. This system thus allows for a health management algorithm combined with fleet management aspects for performing asset management using ESA data and motor operating conditions.

In one or more embodiments, the health classification algorithm may involve at least the following operations. First, a power system asset may be classified into different sub-systems. Examples of such sub-systems may include (stator, supply, load, start, bearing, mechanical, rotor, thermal, electrical, and/or any other types of sub-systems). These are non-limiting examples of sub-systems and any additional and/or alternative sub-systems may be applicable as well. The system may obtain data for analysis using an intelligent electronic device (IED) (such as a relay) associated with the power system including the power system asset(s). Using such an IED, measurements may be obtained (for example, as files and Modbus registers (alarms)) at regular intervals (or in real-time). This data may be stored in one or more databases as data tables, trend charts, etc. The data may also be categorized based on sub-systems included within the power system assets. Based on these sub-systems and the data that is obtained, health indices and health scores may be computed for each individual sub-system that is relevant to the particular sub-system. Once all individual health indices and health scores are computed for each sub-system of the power system asset, then an overall asset-level health index and health score may be computed for the power system asset based on individual weightings provided to each sub-system. The resulting overall asset-level health index and health score may also be further adjusted based on a determined criticality of the particular power system asset. Examples of factors used to determine such criticality are provided below. Once the asset-level health index and health score are calculated, they may be compared to pre-determined thresholds. If the values cross a threshold, an alarm may be triggered to indicate that a health of the power system asset is within a critical range.

In one or more embodiments, within a fleet of assets in a plant, sometimes it may be required to adjust the thresholds (high or low) of certain sub-system measurement parameters of specific assets which exhibit conditions like load oscillations, load pulsations, supply-side harmonics or unbalance, design or application of motor. This is required to make the analysis uniform across the assets. Given this, the thresholds may also be adjustable based on load oscillations that occur in power system assets. An illustration of example operations used to perform the adjustments may be provided with respect to at least FIG. 6.

In one or more embodiments, the health indices and health scores may more specifically include a first health index, a second health index, a first health score, and a second health score. The first health index and first health score may be computed based on the most recent measurement data sample available (for example, the most recent data obtained by the IED), whereas the second health index and second health score may be computed based on an average of short-term, mid-term and long-term data historical data previously captured by the IED. The duration of short-term, mid-term, and long-term data windows may be configurable within the system. In some cases, the default may include up to N, N*2, and N*3 days. A minimum of N records (values) within a specified time duration is may be sufficient for computing mean value to apply risk algorithm with historical data. Example logical flow diagrams illustrating how the first health index, second health index, first health score, and second health score are computed may be provided with respect to at least FIGS. 3A-4C.

In one or more embodiments, once the first health index, a second health index, a first health score, and a second health score are determined, then overall health indices and health scores may be determined for each power system asset sub-system. Following this, the health index and health score for the power system asset as a whole may be determined. The logic for determining these values may be described in further detail with respect to at least FIG. 7.

FIG. 1 depicts a schematic diagram of an example system 100, in accordance with one or more example embodiments of the disclosure.

In one or more embodiments, the system 100 may include a power system asset 108 (for example, a rotating machine such as an induction motor or a synchronous motor, as well as any other type of power system asset) associated with one or more loads 110 and one or more electrical sources 106. The system 100 may also include a local processing device 104 and/or a remote processing device 112.

In one or more embodiments, the local processing device 104 may include an IED, such as a relay, controller, or any other device associated with processing logic. The local processing device 104 may also be located remotely from the power system asset 108 as well. The remote processing device 112 may include a remote server (or another computing system) that may receive data from the local processing device 104, such as data captured from the power system asset 108. The remote processing device 104 may receive data in real-time and may also maintain received data such that historical data associated with the power system asset 108 may be stored. This data may also be stored at the local processing device 104 as well. Using this historical and recent data, the remote processing device 112 may produce health index and health score values 114 for individual sub-systems of the motor 108. Using these health index and health score values 114 for individual sub-systems, an overall health score 120 for the power system asset 108 may be produced. Any of this information may be presented to a user on a user interface 122. The user interface may also include alarms that may trigger when the health index and health score values 114 and/or the overall health score 120 crosses a particular threshold. Any threshold used may also be adjustable (for example, based on load oscillations or other factors). An illustration of how these adjustments may be performed is further illustrated through at least the operations depicted in FIG. 6.

In one or more embodiments, the local processing device 104 and/or the remote processing device 112 may also include at least one or more processors, memory, and one or more analysis modules. Additionally, in some cases, relay devices, which may include microprocessor-based units, may be used for the management and primary protection of medium and large-sized induction and synchronous motors. Base relay models may provide thermal overload and overcurrent protection plus several current and voltage-based backup functions. The local processing device 104 and/or the remote processing device 112 may similarly include any other elements described in FIG. 9 as well. The one or more analysis modules may be configured to perform any of the operations described herein, such as any operations associated with monitoring and diagnosis of fault conditions in power system (for example, methods and/or operations described with respect to FIGS. 2-8, as well as any other methods and/or operations described herein).

FIG. 2 depicts an example sub-system table 200, in accordance with one or more example embodiments of the disclosure.

In one or more embodiments, before the first health index, first health score, second health index, and second health score are determined, a contribution value for a particular sub-system of a power system asset may be determined. This contribution value may be determined using a table, such as the table 200. The logic used in determining the first health index, first health score, second health index, and second health score may vary depending on the contribution value that is obtained using the example table 200. In the example table 200 presented in the figure, the power system asset included a mechanical sub-system (however, this is merely an example, and a power system asset may be divided into any number of other sub-systems as well). The table 200 also depicts information associated with the particular sub-system. A first column 202 indicates the type of sub-system (in this case, a mechanical sub-system). A second column 204 indicates a measurement parameter. A third column 206 indicates an alarm H limit (for example, a first alarm threshold value). A fourth column 208 indicates an alarm H-H limit (for example, a second alarm threshold value). A fifth column 210 may include any comments. The sixth column 212 may include an indication as to whether the asset is an induction machine. The seventh column may include an indication as to whether the asset is a Variable Frequency Drive (VFD)-fed induction machine. The eighth column 216 may indicate the type of power system asset and whether the particular parameter is applicable to the type of power system asset (yes/no). Finally, the ninth column 218 indicates a contribution of the parameter towards overall sub-system index/score computation.

In one or more embodiments, the output of the table 200 may be a particular contribution value associated with the particular sub-system. In table 200, risk contribution may be the max risk (a range of 1-5, for example, or any other range) that a particular measurement may contribute to the overall risk of sub-system when it crosses alarm high-high limit or threshold. Additionally, it should be noted that the table 20 is only intended to be exemplary, and any other type of sub-system and/or information (for example, information in the columns of the table) associated with the sub-system may be applicable as well.

Figure 3A:
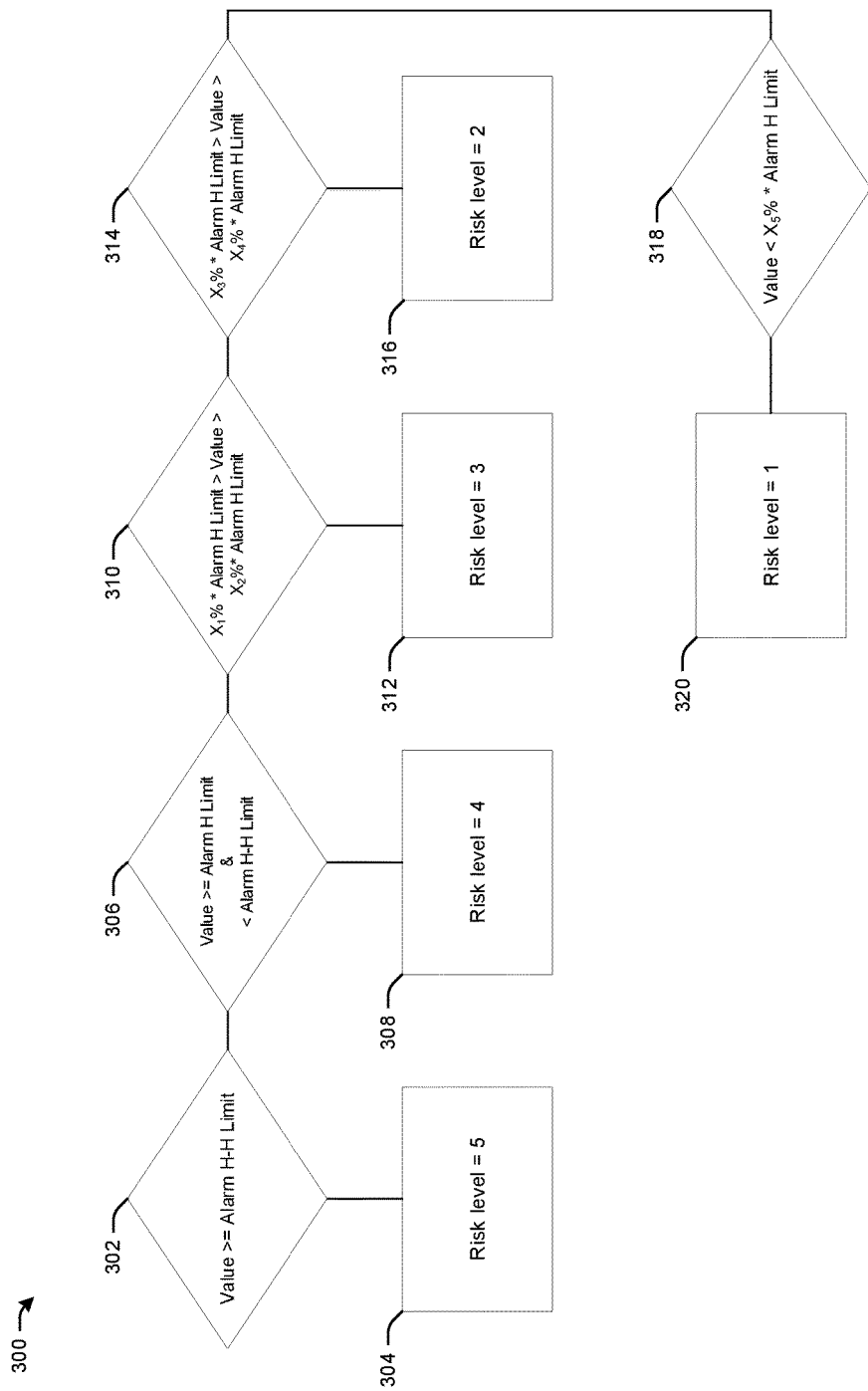
FIGS. 3A-3B depict example flow diagrams, in accordance with one or more example embodiments of the disclosure.
Figure 3B:
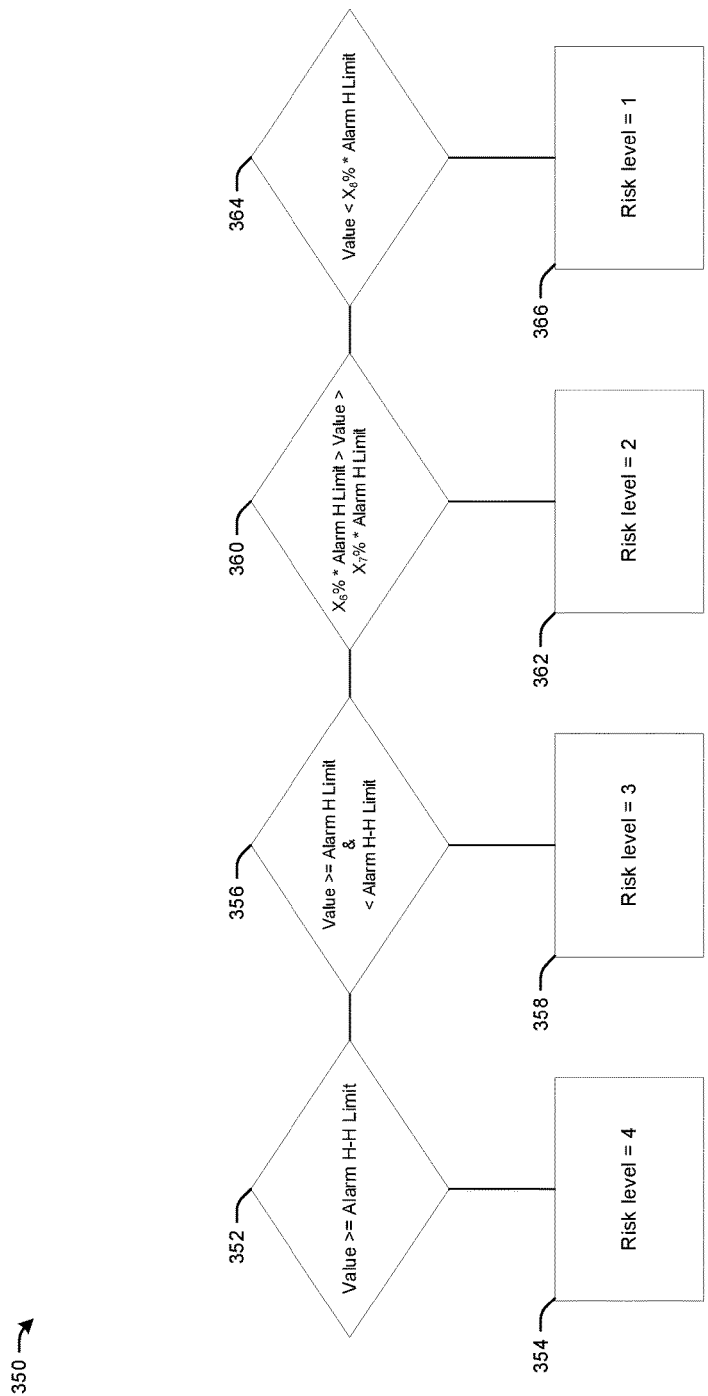

FIGS. 3A-3B depict example flow diagrams (for example, flow diagram 300 and flow diagram 350), in accordance with one or more example embodiments of the disclosure.

In one or more embodiments, the flow diagram 300 and the flow diagram 350 may illustrate example computation rules for individual sub-systems for the first health index and first health score. In the case of transformers, the system may compute the health indices/scores by considering measurement data for each device that is connected to the transformer along with weighted values associated with each device. A power system asset may be classified into different sub-systems, and then the health indices and health scores may be computed for each sub-system separately based on measurement data relevant to that sub-system. Once all individual sub-systems health indices and health scores are computed, then overall asset-level health indices and health scores may be computed based on weighted values provided to each sub-system within the asset.

In one or more embodiments, the health indices may be computed based on the most recent measurement data sample available, whereas the health scores may be computed based on average of short-term, mid-term and long-term historical data. The duration of short-term, mid-term and long-term data windows may be user-configurable or automatically determined by the system.

Beginning with FIG. 3A, the flow diagram 300 illustrates operations that may be performed if a particular measurement is associated with a contribution of 5 (for example, as determined using a table similar to the table 200 illustrated in FIG. 2 (where the contents of the table may vary depending on the particular sub-system). The flow diagram 300 begins with condition 302, which involves determining if a measurement value is greater than or a equal to an alarm H-H limit. This alarm limit may be user-configurable or may be automatically determined. If condition 302 is met, then the flow diagram 300 proceeds to operation 304, which involves setting a level to a value of five. Otherwise, the flow diagram 300 proceeds to condition 306.

Condition 306 involves determining if the measurement value is greater than or equal to an alarm H limit and determining that the measurement value is also less than the alarm H-H limit. The alarm H limit may also be user-configurable or automatically determined. In some cases, the alarm H-H limit, the alarm H limit, and/or any other alarm limit described herein may include a numerical value. If condition 306 is met, then the flow diagram 300 proceeds to operation 308, which involves setting a contribution level to a value of four. Otherwise, the flow diagram 300 proceeds to condition 310.

Condition 310 involves determining if the measurement value is greater than a first percentage value (represented by $X_1\%$, which may be any percentage) of the alarm H limit and determining that the measurement value is also less than a second percentage value (represented by $X_2\%$, which may be any percentage) of the alarm H-H limit. If condition 310 is met, then the flow diagram 300 proceeds to operation 312, which involves setting a contribution level to a value of three. Otherwise, the flow diagram 300 proceeds to condition 314.

Condition 314 involves determining if the measurement value is greater than a third percentage value (represented by $X_3\%$, which may be any percentage) of alarm H limit and determining that the measurement value is also less than a fourth percentage value (represented by $X_4\%$, which may be any percentage) of the alarm H-H limit. If condition 314 is met, then the flow diagram 300 proceeds to operation 316, which involves setting a contribution level to a value of two. Otherwise, the flow diagram 300 proceeds to condition 318.

Condition 318 involves determining if the measurement value is less than a fifth percentage value (represented by $X_5\%$, which may be any percentage) of the alarm H limit. If condition 318 is met, then the flow diagram 300 proceeds to operation 320, which involves setting a contribution level to a value of one.

Turning to FIG. 3B, the flow diagram 300 illustrates operations that may be performed if a particular measurement is associated with a contribution of 4. The flow diagram 350 begins with condition 352, which involves determining if a measurement value is greater than or a equal to an alarm H-H limit. If condition 352 is met, then the flow diagram 350 proceeds to operation 354, which involves setting a contribution level to a value of five. Otherwise, the flow diagram 350 proceeds to condition 356.

Condition 356 involves determining if the measurement value is greater than or equal to an alarm H limit and determining that the measurement value is also less than the alarm H-H limit. If condition 356 is met, then the flow diagram 350 proceeds to operation 358, which involves setting a contribution level to a value of four. Otherwise, the flow diagram 350 proceeds to condition 360.

Condition 360 involves determining if the measurement value is greater than a sixth percentage value (represented by $X_6\%$, which may be any percentage) of alarm H limit and determining that the measurement value is also less than a seventh percentage value (represented by $X_7\%$, which may be any percentage) of the alarm H-H limit. If condition 360 is met, then the flow diagram 350 proceeds to operation 362, which involves setting a contribution level to a value of three. Otherwise, the flow diagram 350 proceeds to condition 364.

Condition 364 involves determining if the measurement value is less than an eighth percentage value (represented by $X_8\%$, which may be any percentage) of the alarm H limit. If condition 364 is met, then the flow diagram 350 proceeds to operation 366, which involves setting a contribution level to a value of one. Any of the values described with respect to FIGS. 3A-3B are not intended to be limiting. That is, the levels may be set to any other values.

In one or more embodiments, when an alarm limit to be considered is two-sided (for example, the measurement must be checked for crossing thresholds on upper and lower sides of rated quantity), then the following rules may be applied.

If a particular measurement (last sample) has risk contribution of 5, then the following rules may apply.

If the measurement value (say 'B') with threshold of ±X % and rated quantity of 'A' then, If, B>=A+(X % of A) OR B<=A−(X % of A) then assign Risk Level=5.

If, [B>=A+(0.8*X % of A) && B<A+(X % of A)] OR [B<=A−(0.8*X % of A)&& B>A−(X % of A)] then assign Risk Level=4.

If, [B>=A+(0.5*X % of A) && B<A+(0.8*X % of A)] OR [B<=A−(0.5*X % of A)&& B>A−(0.8*X % of A)] then assign Risk Level=3.

If, [B>=A+(0.2*X % of A) && B<A+(0.5*X % of A)] OR [B<=A−(0.2*X % of A)&& B>A−(0.5*X % of A)] then assign Risk Level=2.

If, [B>=A+(0.0*X % of A) && B<A+(0.2*X % of A)] OR [B>A−(0.2*X % of A)&& B<=A−(0.0*X % of A)] then assign Risk Level=1.

If a particular measurement (last sample) has risk contribution of 4, then the following rules may apply.

If the measurement value (say 'B') with threshold of ±X % and rated quantity of 'A' then, if, B>=A+(X % of A) OR B<=A−(X % of A) then assign Risk Level=4.

If, [B>=A+(0.7*X % of A) && B<A+(X % of A)] OR [B<=A−(0.7*X % of A)&& B<A−(X % of A)] then assign Risk Level=3.

If, [B>=A+(0.3*X % of A) && B<A+(0.7*X % of A)] OR [B<=A−(0.3*X % of A)&& B<A−(0.7*X % of A)] then assign Risk Level=2.

If, [B>=A+(0.0*X % of A) && B<A+(0.3*X % of A)] OR [B>A−(0.3*X % of A)&& B<=A−(0.0*X % of A)] then assign Risk Level=1.

Figure 4A:
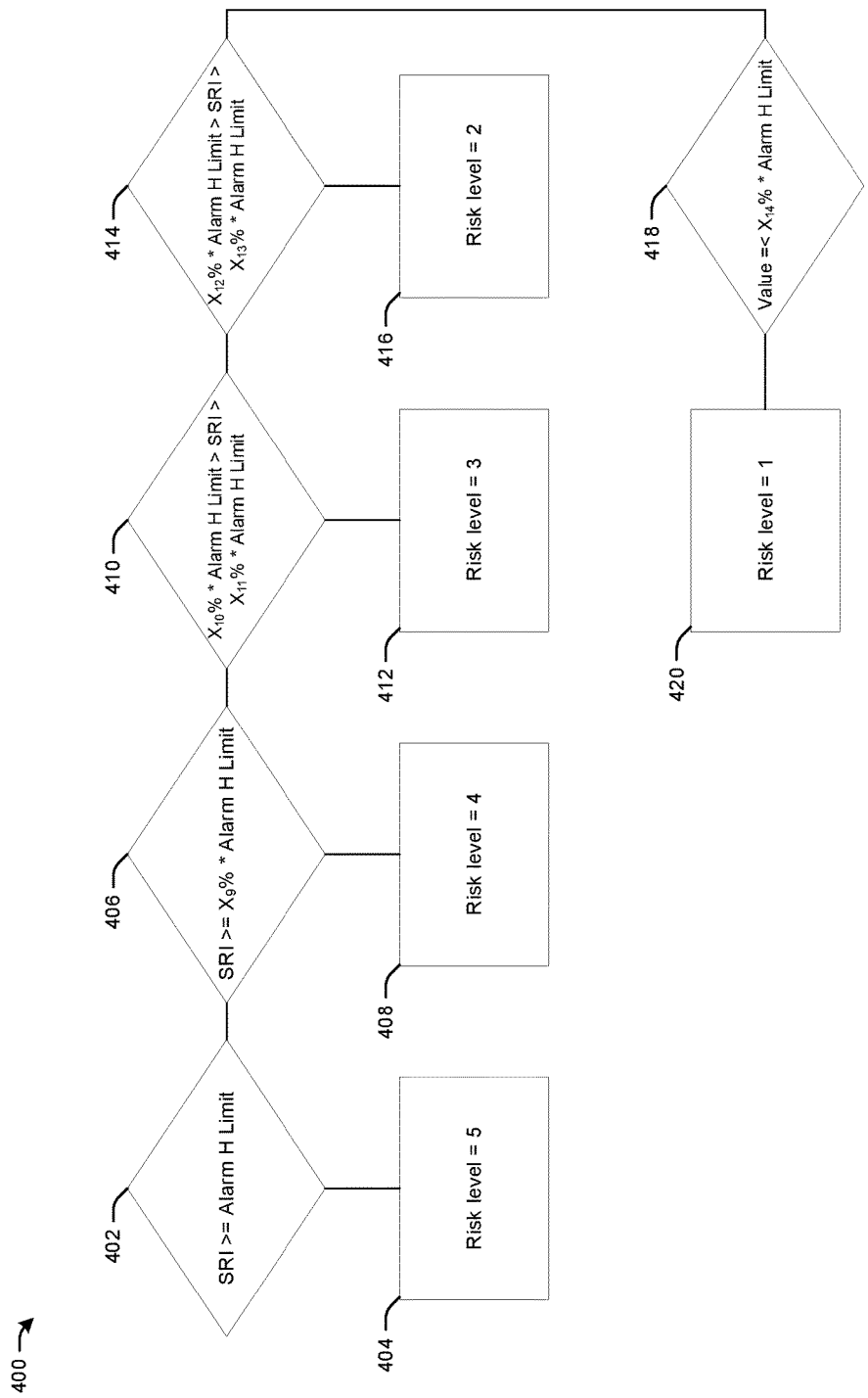
FIGS. 4A-4C depict example flow diagrams, in accordance with one or more example embodiments of the disclosure.
Figure 4B:
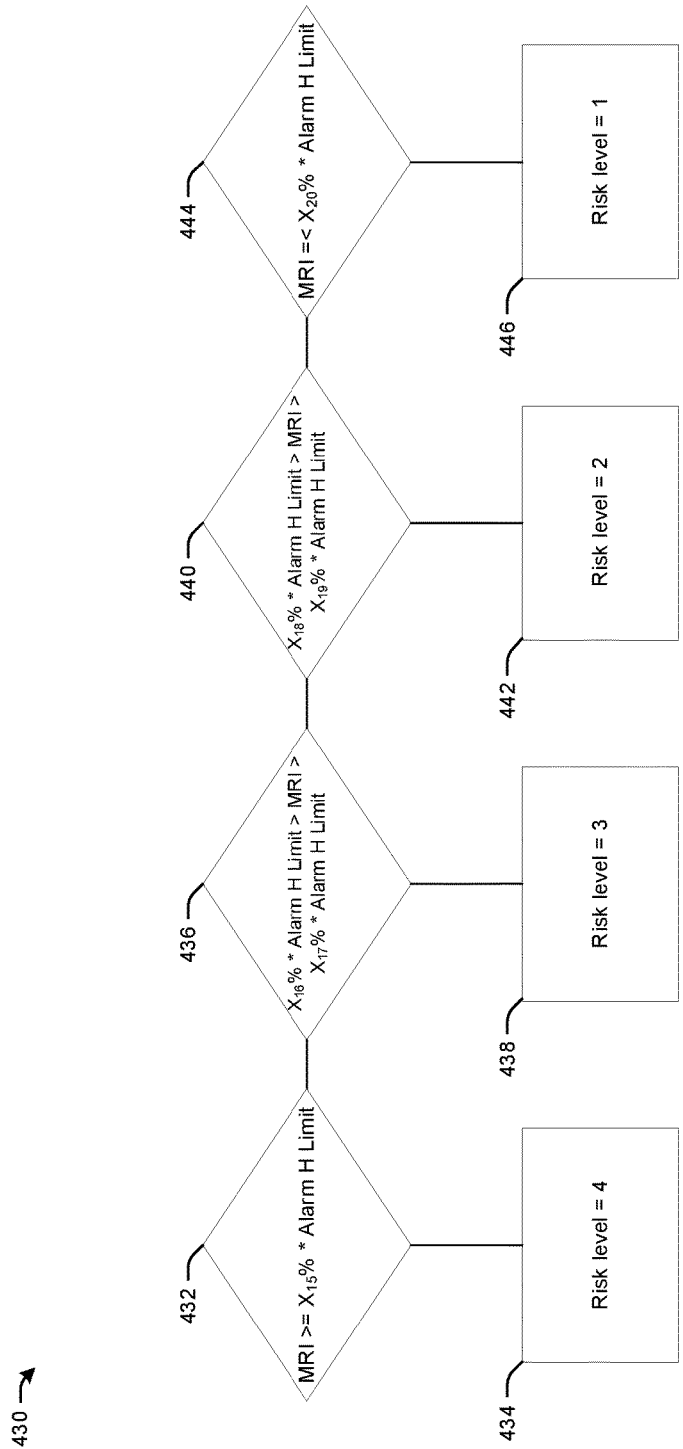
Figure 4C:
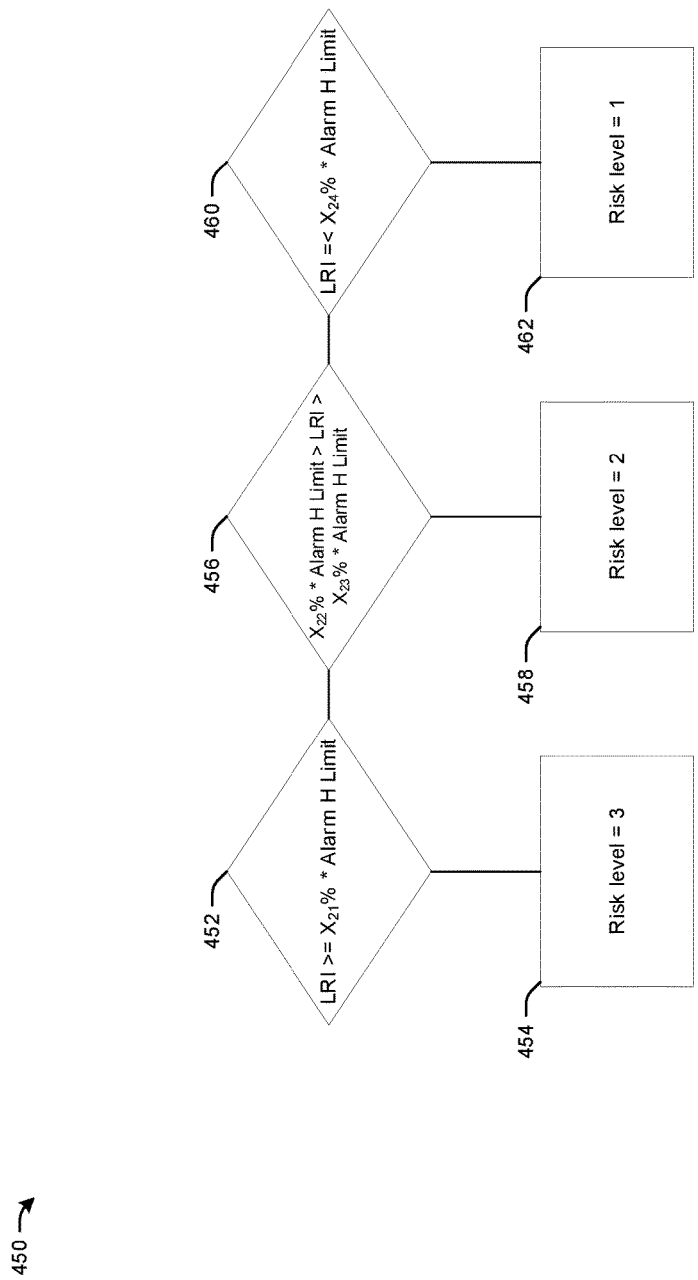

FIGS. 4A-4C depict example flow diagrams (for example, flow diagram 400, flow diagram 430, and flow diagram 450), in accordance with one or more example embodiments of the disclosure. Particularly, the flow diagrams 400, 430, and 450 may illustrate example computation rules for individual sub-systems for the second health index and second health score. The historical data may be considered as short-term, mid-term and long-term. Before computing the average, outliers in data has may be eliminated using standard quartile method and data within the Inter-Quartile range may be considered for analysis. Once the outliers in data are identified and eliminated, average of short-term, mid-term and long-term data may be computed for each of the measurement parameters of subsystems, and then the operations described below may be applied for extracting contribution level values.

If enough short-term historical data is not available, then health score computation may be performed using latest/last data. If enough mid-term historical data is not available, then score computation may be performed using latest/last data and short-term historical data. If enough long-term historical data is not available, then score computation may be performed using latest/last data, short-term and mid-term historical data.

Beginning with FIG. 4A, the flow diagram 400 illustrates example operations that may be performed for determining contribution levels using short-term average data. The flow diagram 400 begins with condition 402, which involves determining if a short-term contribution value is greater than or a equal to an alarm H limit. If condition 402 is met, then the flow diagram 400 proceeds to operation 404, which involves setting a contribution level to a value of five. Otherwise, the flow diagram 400 proceeds to condition 406.

Condition 406 involves determining if the short-term risk contribution value is greater than or equal to a ninth percentage value (represented by $X_9$%, which may be any percentage) of an alarm H limit. If condition 406 is met, then the flow diagram 400 proceeds to operation 408, which involves setting a contribution level to a value of four. Otherwise, the flow diagram 400 proceeds to condition 410.

Condition 410 involves determining if the short-term contribution value is greater than a tenth percentage value (represented by $X_{10}$%, which may be any percentage) of alarm H limit and determining that the short-term contribution value is also less than an eleventh percentage value (represented by $X_{11}$%, which may be any percentage) of the alarm H-H limit. If condition 410 is met, then the flow diagram 400 proceeds to operation 412, which involves setting a contribution level to a value of three. Otherwise, the flow diagram 400 proceeds to condition 414.

Condition 414 involves determining if the short-term contribution value is greater than a twelfth percentage value (represented by $X_{12}$%, which may be any percentage) of alarm H limit and determining that the short-term contribution value is also less than a thirteenth percentage value (represented by $X_{13}$%, which may be any percentage) of the alarm H limit. If condition 414 is met, then the flow diagram 300 proceeds to operation 418, which involves setting a contribution level to a value of two. Otherwise, the flow diagram 400 proceeds to condition 418.

Condition 418 involves determining if the measurement value is less than a fourteenth percentage value (represented by $X_{14}$%, which may be any percentage) of the alarm H limit. If condition 418 is met, then the flow diagram 400 proceeds to operation 420, which involves setting a contribution level to a value of one.

Turning to FIG. 4B, the flow diagram 430 illustrates example operations that may be performed for determining contribution levels using mid-term average data.

The flow diagram 430 begins with condition 432, which involves determining if a mid-term risk contribution value is greater than or a equal to a fifteenth percentage value (represented by $X_{15}$%, which may be any percentage) of an alarm H limit. If condition 432 is met, then the flow diagram 430 proceeds to operation 434, which involves setting a contribution level to a value of four. Otherwise, the flow diagram 430 proceeds to condition 436.

Condition 436 involves determining if the mid-term contribution value is greater than a sixteenth percentage value (represented by $X_{16}$%, which may be any percentage) of alarm H limit and determining that the mid-term contribution value is also less than a seventeenth percentage value (represented by $X_{17}$%, which may be any percentage) of the alarm H limit. If condition 436 is met, then the flow diagram 430 proceeds to operation 438, which involves setting a contribution level to a value of three. Otherwise, the flow diagram 430 proceeds to condition 440.

Condition 440 involves determining if the mid-term contribution value is greater than an eighteenth percentage value (represented by $X_{18}$%, which may be any percentage) of alarm H limit and determining that the mid-term contribution value is also less than a nineteenth percentage value (represented by $X_{19}$%, which may be any percentage) of the alarm H limit. If condition 440 is met, then the flow diagram 430 proceeds to operation 442, which involves setting a contribution level to a value of two. Otherwise, the flow diagram 430 proceeds to condition 444.

Condition 444 involves determining if the mid-term contribution value is less than or equal to a twentieth percentage value (represented by $X_{20}$%, which may be any percentage) of the alarm H limit. If condition 444 is met, then the flow diagram 430 proceeds to operation 446, which involves setting a contribution level to a value of one.

Turning to FIG. 4C, the flow diagram 450 illustrates example operations that may be performed for determining contribution levels using long-term average data.

The flow diagram 450 begins with condition 452, which involves determining if a long-term contribution value is greater than or equal to A twenty-first percentage value (represented by $X_{21}$%, which may be any percentage) of an alarm H limit. If condition 452 is met, then the flow diagram 450 proceeds to operation 454, which involves setting a contribution level to a value of three. Otherwise, the flow diagram 450 proceeds to condition 456.

Condition 456 involves determining if the long-term contribution value is greater than a twenty-second percentage value (represented by $X_{22}$%, which may be any percentage) of alarm H limit and determining that the long-term contribution value is also less than a twenty-third percentage value (represented by $X_{23}$%, which may be any percentage) of the alarm H limit. If condition 456 is met, then the flow diagram 450 proceeds to operation 458, which involves setting a contribution level to a value of two. Otherwise, the flow diagram 450 proceeds to condition 460.

Condition 460 involves determining if the long-term contribution value is less than or equal to a twenty-fourth percentage value (represented by $X_{24}$%, which may be any percentage) of the alarm H limit. If condition 460 is met, then the flow diagram 450 proceeds to operation 462, which involves setting a contribution level to a value of one.

In one or more embodiments, when an alarm limit to be considered is two-sided (for example, the measurement average must be checked for crossing threshold on both sides of rated value), then the following rules may be applied.

If short-term average or SRI of the measurement value (say 'B') with threshold of ±X % and rated quantity of 'A' then the following rules may apply.

If, B>=A+(X % of A) OR B<=A−(X % of A), assign risk level=5.

If [B>=A+(0.8*X % of A) && B<A+(X % of A)] OR [B<=A−(0.8*X % of A) && B>A−(X % of A)], assign risk level=4.

If [B>=A+(0.5*X % of A) && B<A+(0.8*X % of A)] OR [B<=A−(0.5*X % of A)&& B>A−(0.8*X % of A)], assign risk level=3.

If [B>=A+(0.2*X % of A) && B<A+(0.5*X % of A)] OR [B<=A−(0.2*X % of A)&& B>A−(0.5*X % of A)], assign risk level=2.

If [B>=A+(0.0*X % of A) && B<A+(0.2*X % of A)] OR [B>A−(0.2*X % of A)&& B<=A−(0.0*X % of A)], assign risk level=1.

If mid-term average or MRI of the measurement value (say 'B') with threshold of ±X % and rated quantity of 'A' then the following rules may apply.

If B>=A+(X % of A) OR B<=A−(X % of A), assign risk level=4.

If [B>=A+(0.7*X % of A) && B<A+(X % of A)] OR [B<=A−(0.7*X % of A)&& B>A−(X % of A)], assign risk level=3.

If [B>=A+(0.3*X % of A) && B<A+(0.7*X % of A)] OR [B<=A−(0.3*X % of A)&& B>A−(0.7*X % of A)], assign risk level=2.

If [B>=A+(0.0*X % of A) && B<A+(0.3*X % of A)] OR [B>A−(0.3*X % of A)&& B<=A−(0.0*X % of A)], assign risk level=1.

If long-term average or LRI of the measurement value (say 'B') with threshold of ±X % and rated quantity of 'A' then the following rules may apply.

If B>=A+(X % of A) OR B<=A−(X % of A), assign risk level=3.

If [B>=A+(0.5*X % of A) && B<A+(X % of A)] OR [B<=A−(0.5*X % of A) && B>A−(X % of A)], assign risk level=2.

If [B>=A+(0.0*X % of A) && B<A+(0.5*X % of A)] OR [B>A−(0.5*X % of A)&& B<=A−(0.0*X % of A)], assign risk level=1.

Figure 5:
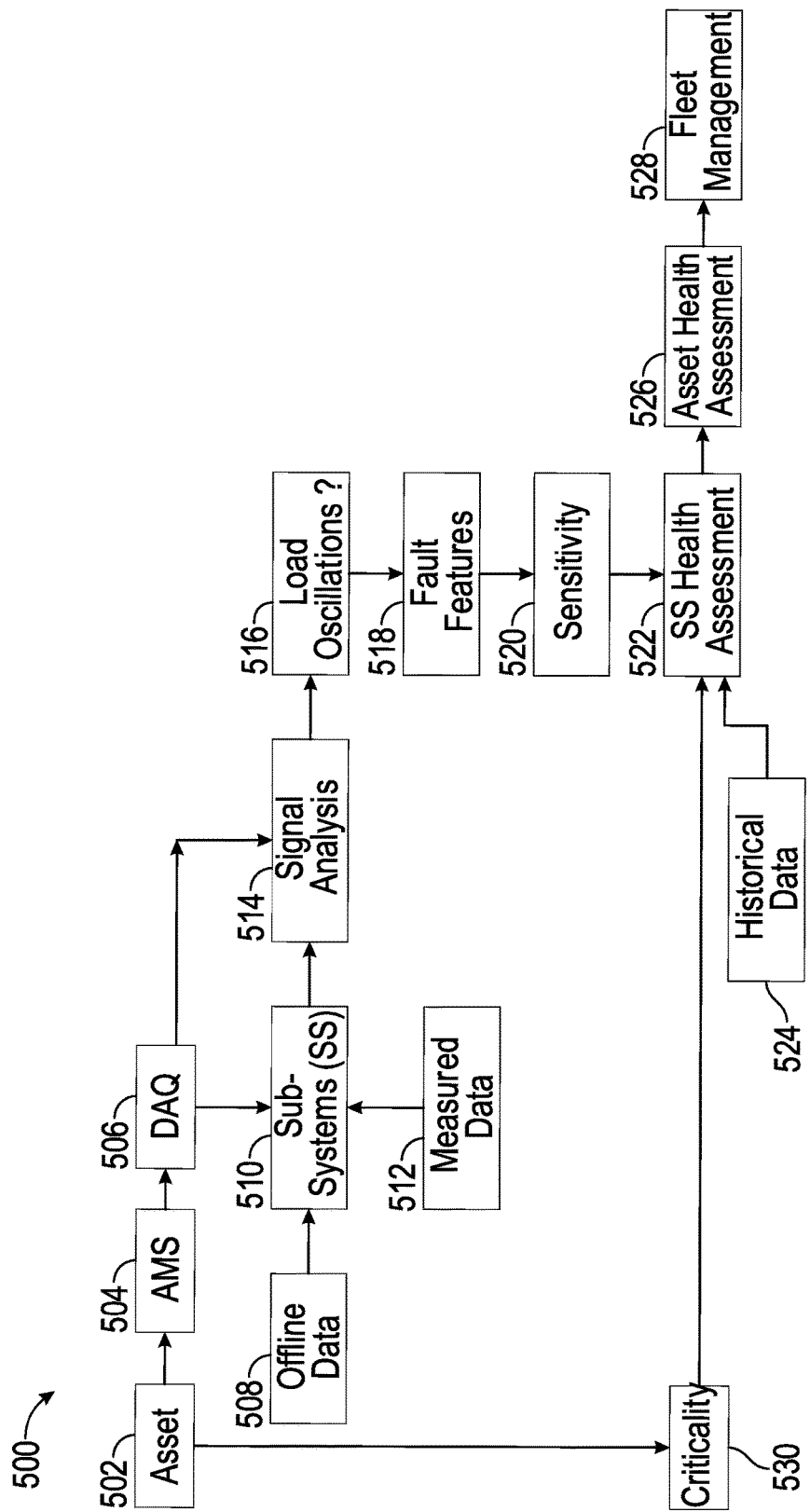
FIG. 5 depicts an example flow diagram, in accordance with one or more example embodiments of the disclosure.

FIG. 5 depicts an example flow diagram 500, in accordance with one or more example embodiments of the disclosure.

In one or more embodiments, for a given asset, the flow diagram 500 may depict the data acquisition of different types of data combined with signal analysis of the data. Further, fault indicators may be extracted based on load oscillations and analyzed for assessing risk condition of asset considering sensitivity and criticality factors related to asset management. The flow diagram 500 may begin with operation 514, which may involve performing signal analysis based on different data sources. For example, the data may include offline data 508 and measured data 512 (for example, data measured by an IED 104 or any other type of device), among other types of data, for individual subsystems 510 associated with a given asset (for example, asset 502) may be obtained for purposes of performing the signal analysis. Operation 514 is followed by operation 516, which may involve determining if load oscillations exist in the asset 502. Operation 516 is followed by operation 518, which may involve identifying fault features in the asset 502. Operation 518 is followed by operation 520, which may involve determining and/or adjusting a sensitivity (for example, threshold values) based on any load oscillation and/or fault feature determinations. Operation 520 is followed by operations 522, which may involve performing a sub-system health assessment (such as assessment may be performed for each sub-system associated with the asset 502). Operation 522 may be performed using historical data 524 associated with the asset 502 as well. Operations 520 and 522, for example, may involve operations described with respect to FIGS. 3-4 and 7, as well as any other operations described herein. Operation 522 may also be performed using criticality information 530 associated with the asset (this criticality information is described in additional detail with respect to FIG. 7). Operation 522 is followed by operation 526, which may involve performing an asset health assessment. Operation 526 may be followed by operation 528, which may involve management of a fleet of assets including the asset 502.

Figure 6:
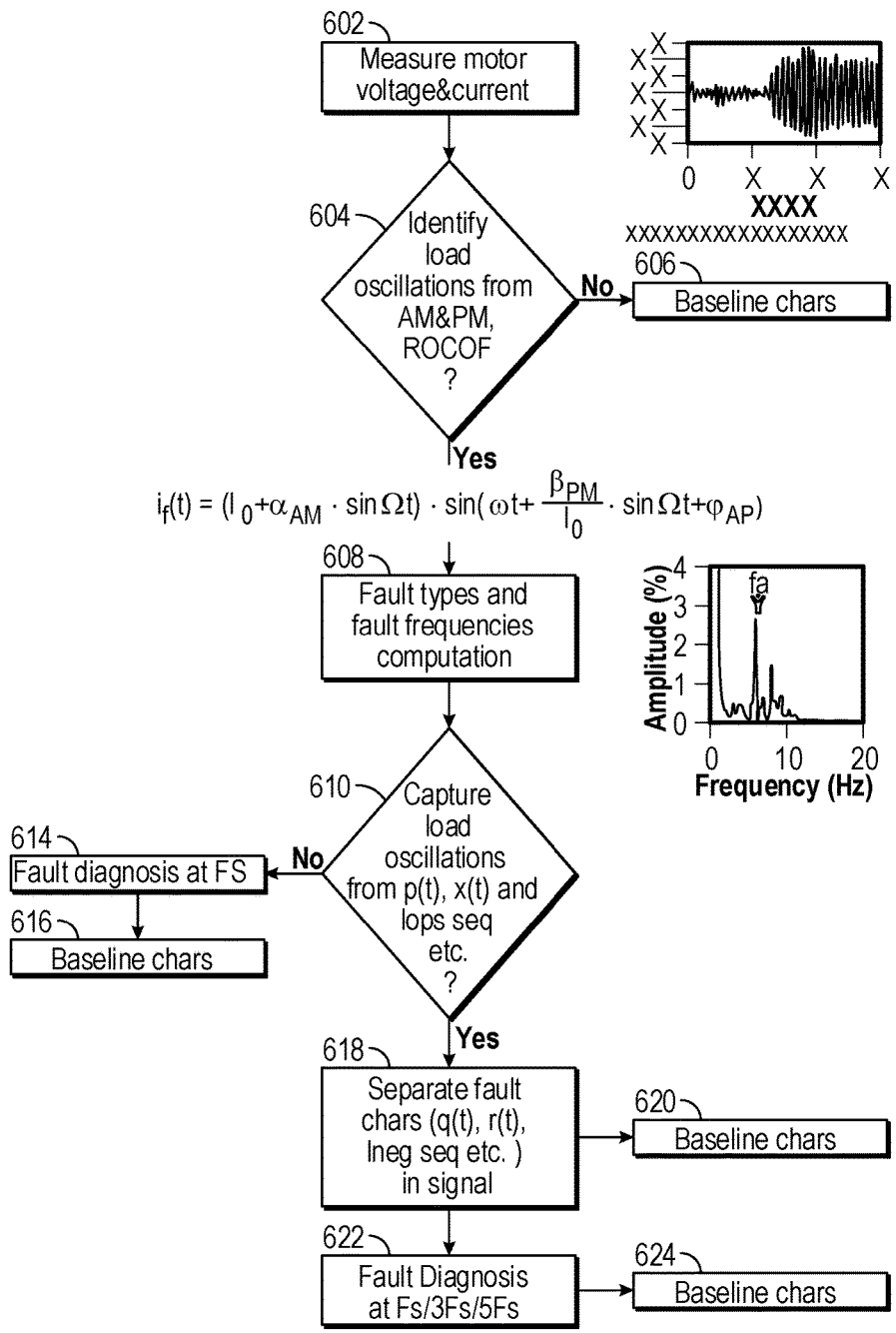
FIG. 6 depicts an example flow diagram, in accordance with one or more example embodiments of the disclosure.
Figure 6:
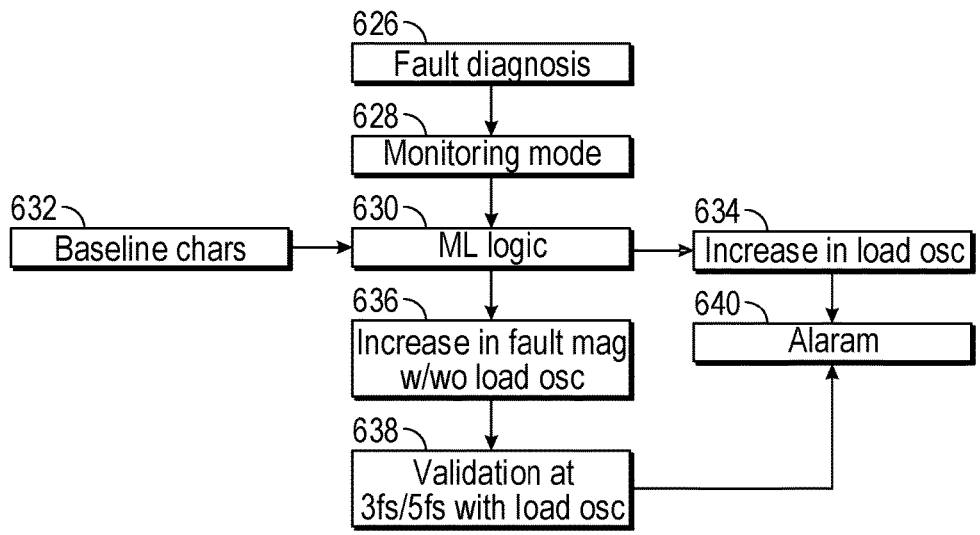

FIG. 6 depicts an example flow diagram 600, in accordance with one or more example embodiments of the disclosure.

In one or more embodiments, the flow diagram 600 may illustrate operations involved in determining any alarm thresholds and/or limits described herein. As illustrated through these operations, the alarm thresholds and/or limits may not necessarily be fixed, but rather may evolve over time. The flow diagram 600 may begin with operation 602, which may involve measuring motor voltage and current data. In some cases, the measurements may be performed by the local processing device 104 (such as an intelligent relay device). Operation 602 is followed by operation 604, which may involve identifying load oscillations in the asset from amplitude modulation (AM), phase modulation (PM), and/ or rate of change of frequency (ROCOFC) values. Operation 604 is followed by operation 606 and operation 608. Operation 606 may involve establishing baseline characteristics for the asset based on the measured voltage and current data and/or any load oscillation determinations. Operation 608 may involve performing fault type and fault frequency computations. Operation 608 is followed by operation 610, which may involve capturing load oscillations from p(t), x(t), and Ipos seq., etc. These values may the magnitudes or levels of load oscillation components present in the signal. Operation 610 is followed by operation 614 or operation 618. Operation 614 may involve performing fault diagnoses. Operation 614 is followed by operation 616, which may involve performing baselining. Operation 618 may involve separating fault characteristics in the signal. Operation 618 is followed by operations 620 and 622. Operation 620 may involve performing baselining. Operation 622 may involve performing fault diagnoses. Operation 622 is followed by operation 624, which may involve performing baselining.

In one or more embodiments, operations 602-624 may be followed by operations 626-638. Operation 626 may involve performing fault diagnoses. Operation 628 may involve initiating a monitoring mode. Operation 630 may involve utilizing machine learning (or artificial intelligence, or the like) logic based on baseline characteristics determined in operations 602-624. Operation 624 may involve identifying an increase in load oscillations using the machine learning logic. Operation 634 is followed by operation 640, which may involve presenting an alarm based on the increase in load oscillations. Operation 630 is also be followed by operation 636, which may involve identifying an increase in a fault magnitude with or without load oscillations. Operation 636 is followed by operation 638, which may involve performing validation with load oscillation. Operation 638 is followed by operation 640.

At a high level, operations 614-624 may involve capturing baseline characteristics in the presence of load oscillations, and operations 626-640 may involve combining baseline characteristics combined with machine learning (or artificial intelligence, or the like) for analyzing fault condition with or without presence of load oscillations.

FIG. 7 depicts an example health index table 700, in accordance with one or more example embodiments of the disclosure.

In one or more embodiments, the health index table 700 may be used to determine an overall health index for an asset sub-system based on any first health indices and second health indices that may have been previously determined. The first health index and second health index that are used for each sub-system in determining the overall sub-system health index may be based on the maximum contribution levels determined through the operations of FIGS. 3A-3B (in making the first health index and first health score determinations) and FIGS. 4A-4C (in making the second health index and second health score determinations). The first health index and second health index may then be compared to the table 700 to determine the final health index for the particular sub-system. For example, the first health index may be associated with a value included in a first column 704 of the table 700 and the second health index may be associated with a value included in a first row 702 of the table (or vice versa). The final health index may then be the value in the table that corresponds to the column represented by the second health index and the row represented by the first health index. For example, if the first health index is a value of 3 and the second health index is a value of 4, then the final health index may be a value of 4 according to the table 700.

In one or more embodiments, once final health indices are determined for every sub-system of the asset, an overall asset health index may be determined as the maximum value of all health indices contributed by individual sub-systems. In the example presented in table 710, the overall asset health index may be a value of 5 because the maximum overall health index is 5 (the health index associated with the bearing sub-system). It should be noted that these are just examples of types of sub-systems and associated values and these examples are not intended to be limiting in any way.

In one or more embodiments, a final health score for each sub-system of the asset may also be determined using the following equation.

Final Health Score of Sub-System or Component
Health Score=((0.3*Health Score 1)+
(0.7*Health Score 2))

In one or more embodiments, a first health score value (Health Score 1) and a second health score value (Health Score 2) for each sub-system may be computed using the below equation and by using latest and/or historical averages data respectively.

$$\frac{\sum(\text{Current Health Indices of each component}) -}{\text{Number of components}}$$
$$\frac{\sum(\text{The worst Indices of each component}) -}{\text{Number of components}}$$

In one or more embodiments, the final overall health score of the asset may be computed by assigning weight values to each sub-system and by using the below equations. These weight values may be manually determined or automatically set by the system.

Final Score=Σ(Weighted Components Health Score)

Weighted Component Health Score=Component
Health Score*Data Available*

$$\frac{\text{Weight in group} * \text{Weight in total}}{\text{Total Weight}}$$

In one or more embodiments, any determined health indices or health scores may also be adjusted by an additional percentage based on a criticality of the particular asset being measured. Different assets in a fleet of assets may fall within one or more criticality ranges. Based on the criticality range that a particular assets falls within, a health index or health score may be increased or decreased by a certain percentage. The particular criticality range that an asset falls within may be determined based on any number of different factors. Examples of such factors may include the percentage process loss if the motor fails, if any spare motors are available, access available for minor repairs and/or major repairs, whether the motor supplier is operational, whether spare motor parts are available, a motor age, a history of faults in the motor, and/or any other factors. For example, if it would be more difficult to replace a particular motor (asset), then the motor may be associated with a high criticality factor, and the associated health indices and/or health scores may correspondingly be increased by a certain percentage based on this criticality. Likewise, a motor that is more easily replaceable may be associated with a lower criticality factor, and the health indices and/or health scores may correspondingly be decreased by a certain percentage based on this criticality.

Figure 8:
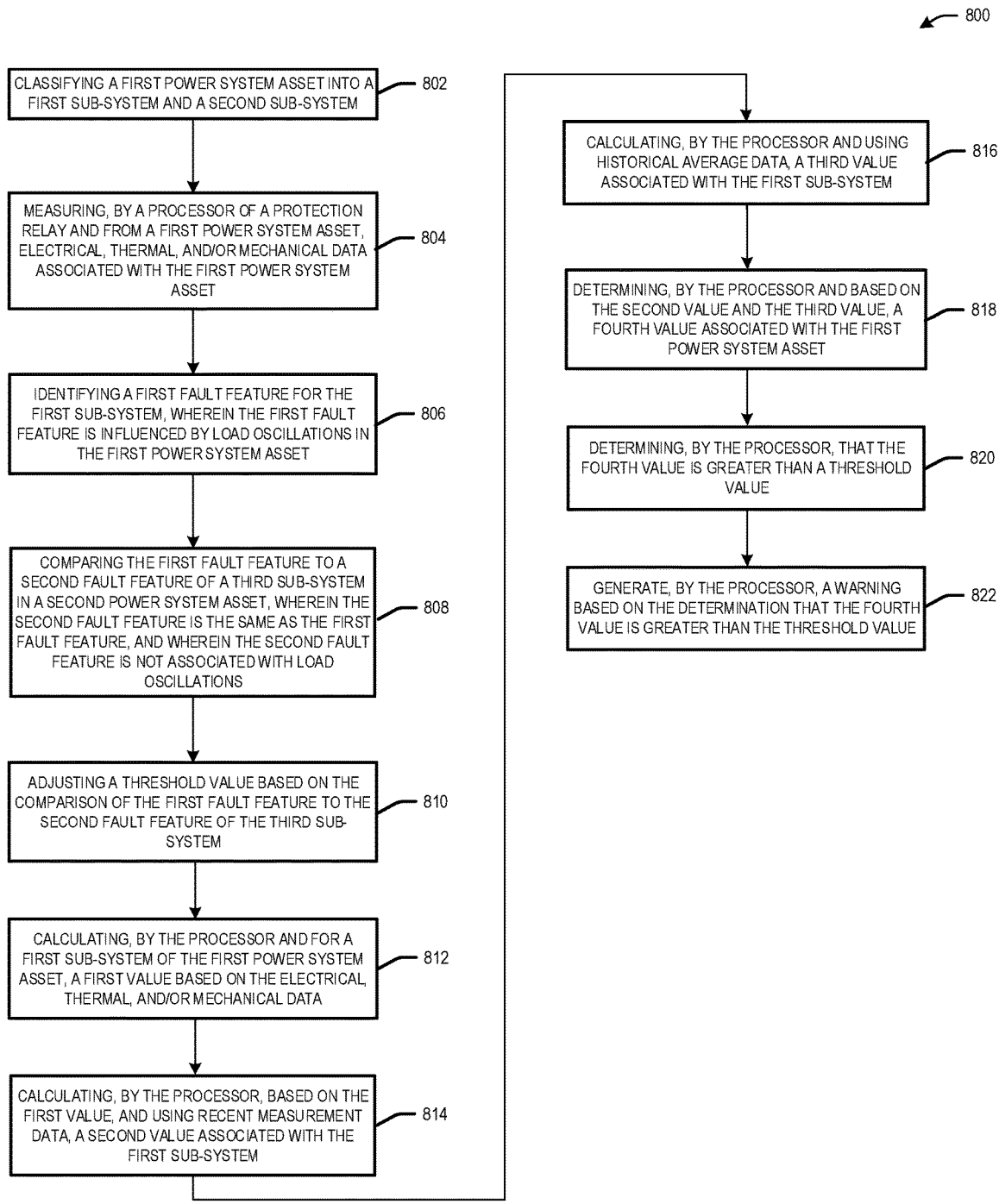
FIG. 8 is a block diagram of an example method, in accordance with one or more example embodiments of the disclosure.

FIG. 8 is an example process flow diagram of an illustrative method 800. At block 802, the method 800 may include classifying a first power system asset into a first sub-system and a second sub-system. At block 804, the method 800 may include measuring, by a processor of a protection relay and from a first power system asset, electrical, thermal, and/or mechanical data associated with the first power system asset. At block 806, the method 800 may include identifying a first fault feature for the first sub-system, wherein the first fault feature is influenced by load oscillations in the first power system asset. At block 808, the method 800 may include comparing the first fault feature to a second fault feature of a third sub-system in a second power system asset, wherein the second fault feature is the same as the first fault feature, and wherein the second fault feature is not associated with load oscillations. At block 810, the method 800 may include adjusting a threshold value based on the comparison of the first fault feature to the second fault feature of the third sub-system. At block 812, the method 800 may include calculating, by the processor and for a first sub-system of the first power system asset, a first value based on the electrical, thermal, and/or mechanical data. At block 814, the method 800 may include calculating, by the processor, based on the first value, and using recent measurement data, a second value associated with the first sub-system. At block 816, the method 800 may include calculating, by the processor and using historical average data, a third value associated with the first sub-system. At block 818, the method 800 may include determining, by the processor and based on the second value and the third value, a fourth value associated with the first power system asset. At block 820, the method 800 may include determining, by the processor, that the fourth value is greater than a threshold value. At block 824, the method 800 may include generate, by the processor, a warning based on the determination that the fourth value is greater than the threshold value.

In one or more embodiments, the method 800 may further include calculating, for a second sub-system of the first power system asset, a fifth value, wherein the second sub-system is a different type of sub-system than the first sub-system. The method 800 may further include calculating, based on the fifth value and using recent measurement data, a sixth value associated with the second sub-system. The method 800 may further include calculating, using historical average data, a seventh value associated with the second sub-system, wherein determining the fourth value associated with the first power system asset is further based on the sixth value and the seventh value.

The method 800 may further include calculating an eighth value for the first sub-system based on a first weighted value calculated using the second value associated with the first sub-system and a second weighted value calculated using the third value associated with the first sub-system, wherein the fourth value associated with the first power system asset is determined based on the eighth value.

In one or more embodiments, the second value and the third value are determined by comparing the recent measurement data and the historical average data to one or more threshold values.

In one or more embodiments, the fourth value associated with the first power system asset is further weighted based on an asset criticality factor.

In one or more embodiments, the historical average data includes short-term, mid-term, and long-term historical data.

In one or more embodiments, the first sub-system includes at least one of: a mechanical sub-system, a thermal sub-system, a thermal sub-system, a rotor sub-system, a stator sub-system, a supply sub-system, a load sub-system, and/or a bearing sub-system, wherein the fourth value associated with the first power system asset is based on one or more values for each sub-system in the first power system asset.

The operations described and depicted in the illustrative process flow of FIGS. 3A-6 and FIG. 8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3A-6 and FIG. 8 may be performed.

One or more operations of the process flow of FIGS. 3A-6 and FIG. 8 may have been described above as being performed by a user device, or more specifically, by one or more program modules, applications, or the like executing on a device. It should be appreciated, however, that any of the operations of process flow of FIGS. 3A-6 and FIG. 8 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 9:
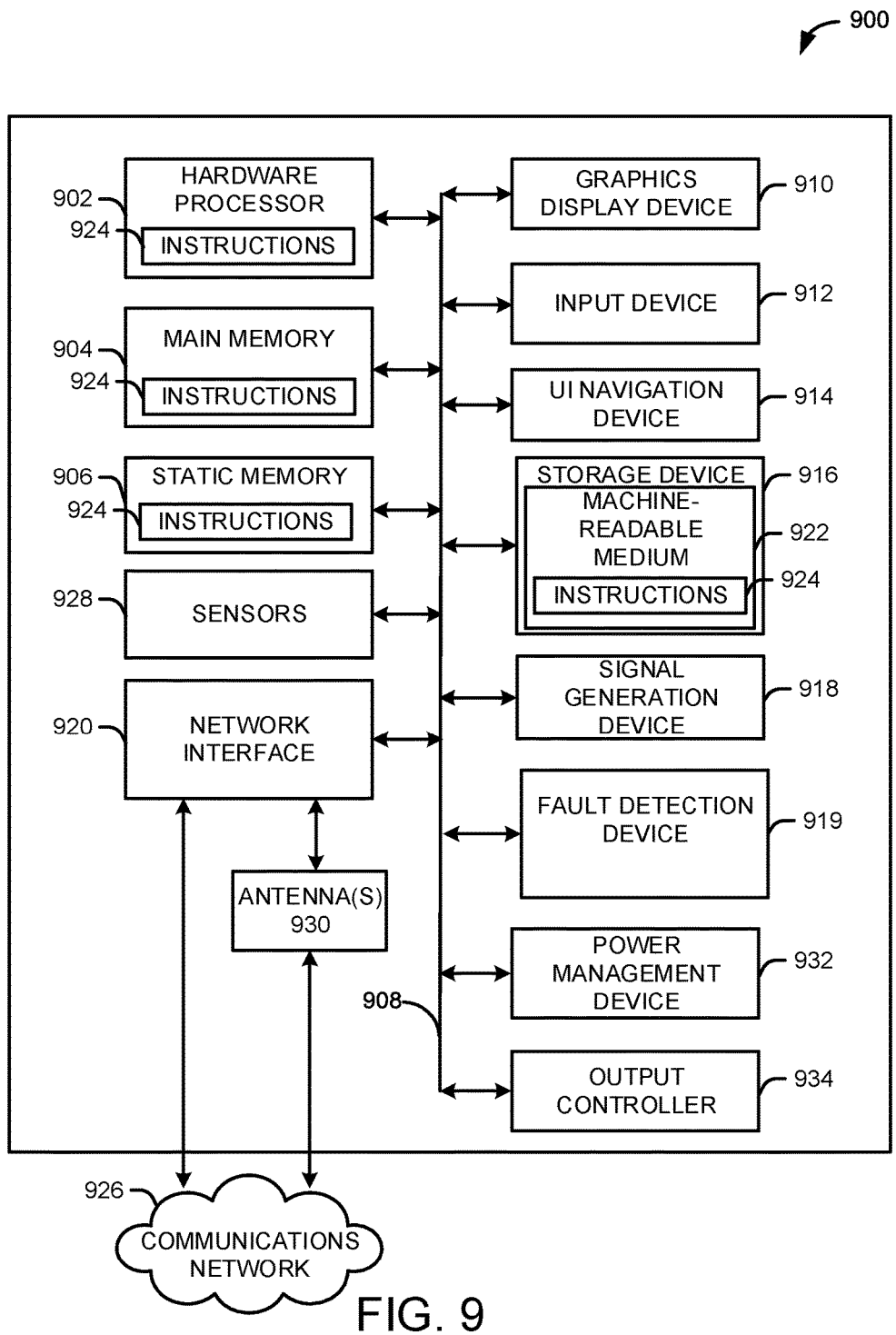
FIG. 9 is a block diagram of an example of a machine or system, in accordance with one or more example embodiments of the disclosure.

FIG. 9 is a block diagram of an example of a machine or system 900 in accordance with one or more example embodiments of the disclosure.

In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a server (e.g., a real-time server), a computer, an automation controller, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuration may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 998. The machine 900 may further include a power management device 932, a graphics display device 910, an input device 912 (e.g., a keyboard), and a user interface (UI) navigation device 914 (e.g., a mouse). In an example, the graphics display device 910, input device 912, and UI navigation device 914 may be a touch screen display. The machine 900 may additionally include a storage device (i.e., drive unit) 916, a signal generation device 918 (e.g., an emitter, a speaker), a fault detection device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The fault detection device 919 may carry out or perform any of the operations and processes (e.g., the flow diagrams described with respect to FIGS. 3-8) described above.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "monitoring and computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, numerous other modifications and embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

That which is claimed is:

1. A method of non-intrusively measuring power system asset sub-component data and assessing performance of power system assets based on their sub-components, the method comprising:

measuring, non-intrusively and by respective intelligent electronic devices (IEDs), of a power system, connected to respective sub-systems of respective assets of the power system, electrical, thermal, and/or mechanical data of the respective assets of the power system;

categorizing, by the respective IEDs, the electrical, thermal, and/or mechanical data of the respective assets into the respective sub-systems of each of the respective assets;

providing to at least one processor, by the respective IEDs and using at least one communications network, the categorized electrical, thermal, and/or mechanical data of the respective assets;

identifying, by the at least one processor, a first fault feature for a first sub-system of a first power system asset of the respective assets, wherein the first fault feature is influenced by load oscillations in the first power system asset;

comparing, by the at least one processor, the first fault feature to a second fault feature of a second sub-system in a second power system asset of the respective assets, wherein the second fault feature is the same as the first fault feature, and wherein the second fault feature is not associated with load oscillations;

adjusting, by the at least one processor, a threshold value based on the comparison of the first fault feature to the second fault feature of the second sub-system;

calculating, by the at least one processor and for a first sub-system of the first power system asset, a first value based on electrical, thermal, and/or mechanical data of the first power system asset included in the categorized electrical, thermal, and/or mechanical data of the respective assets;

calculating, by the at least one processor, based on the first value, and using recent measurement data of the categorized electrical, thermal, and/or mechanical data of the respective assets, a first health index of the first sub-system;

calculating, by the at least one processor and using historical average data of the categorized electrical, thermal, and/or mechanical data of the respective assets, a first health score of the first sub-system;

determining, by the processor and based on the first health index, the first health score, a second health index of a third sub-system of the first power system asset, a second health score of the third sub-system, and respective weightings of the first sub-system and the third sub-system, an overall health score of the first power system asset;

determining, by the processor, that the overall health score is greater than a threshold value; and generating, by the processor, a warning based on the determination that the overall health score is greater than the threshold value.

2. The method of claim 1, wherein the second sub-system is a different type of sub-system than the first sub-system.

3. The method of claim 1, further comprising:

calculating a weighted health index for the first sub-system based on a first weighted value calculated using the first health index and a second weighted value calculated using the health score, wherein the overall health score of the first power system asset is determined based on the weighted health index.

4. The method of claim 1, wherein the first health index and the first health score are determined by comparing the recent measurement data and the historical average data to one or more threshold values.

5. The method of claim 1, wherein the overall health score of the first power system asset is further weighted based on an asset criticality factor.

6. The method of claim 1, wherein the historical average data includes short-term, mid-term, and long-term historical data.

7. The method of claim 1, wherein the first sub-system includes at least one of: a mechanical sub-system, a thermal sub-system, a thermal sub-system, a rotor sub-system, a stator sub-system, a supply sub-system, a load sub-system, and/or a bearing sub-system, wherein the overall health score of the first power system asset is based on one or more values for each sub-system in the first power system asset.

8. A system comprising:
power system assets comprising respective sub-systems; and
respective intelligent electronic devices (IEDs) connected to the respective sub-systems, the respective IEDs comprising:
a processor; and
a memory storing computer-executable instructions, that when executed by the processor, cause the processor to:
measure, non-intrusively, electrical, thermal, and/or mechanical data of the respective assets of the power system;
categorize the electrical, thermal, and/or mechanical data of the respective assets into the respective sub-systems of each of the respective assets;
provide to at least one second processor, using at least one communications network, the categorized electrical, thermal, and/or mechanical data of the respective assets;
identify a first fault feature for a first sub-system of a first power system asset of the respective assets, wherein the first fault feature is influenced by load oscillations in the first power system asset;
compare the first fault feature to a second fault feature of a second sub-system in a second power system asset of the respective assets, wherein the second fault feature is the same as the first fault feature, and wherein the second fault feature is not associated with load oscillations;
adjust a threshold value based on the comparison of the first fault feature to the second fault feature of the second sub-system;
calculate, for a first sub-system of the first power system asset, a first value based on electrical, thermal, and/or mechanical data of the first power system asset included in the categorized electrical, thermal, and/or mechanical data of the respective assets;
calculate, based on the first value and using recent measurement data of the categorized electrical, thermal, and/or mechanical data of the respective assets, a first health index of the first sub-system;
calculate, using historical average data of the categorized electrical, thermal, and/or mechanical data of the respective assets, a first health score of the first sub-system;
determine, based on the first health index, the first health score, a second health index of a third sub-system of the first power system asset, a second health score of the third sub-system, and respective weightings of the first sub-system and the third sub-system, an overall health score of the first power system asset;
determine that the overall health score is greater than a threshold value; and
generate a warning based on the determination that the overall health score is greater than the threshold value.

9. The system of claim 8, wherein the second sub-system is a different type of sub-system than the first sub-system.

10. The system of claim 8, wherein the computer-executable instructions further cause the processor to:
calculate a weighted health index for the first sub-system based on a first weighted value calculated using the first health index and a second weighted value calculated using the health score,
wherein the overall health score of the first power system asset is determined based on the weighted health index.

11. The system of claim 8, wherein the first health index and the first health score are determined by comparing the recent measurement data and the historical average data to one or more threshold values.

12. The system of claim 8, wherein the overall health score of the first power system asset is further weighted based on an asset criticality factor.

13. The system of claim 8, wherein the historical average data includes short-term, mid-term, and long-term historical data.

14. The system of claim 8, wherein the first sub-system includes at least one of: a mechanical sub-system, a thermal sub-system, a thermal sub-system, a rotor sub-system, a stator sub-system, a supply sub-system, a load sub-system, and/or a bearing sub-system, wherein the overall health score the first power system asset is based on one or more values for each sub-system in the first power system asset.

15. A non-transitory computer-readable medium storing computer-executable instructions for non-intrusively measuring power system asset sub-component data and assessing performance of power system assets based on their sub-components, that when executed by a processor of a protection relay, cause the processor to perform operations of:
measuring, non-intrusively and using respective intelligent electronic devices (IEDs), of a power system, connected to respective sub-systems of respective assets of the power system, electrical, thermal, and/or mechanical data of the respective assets of the power system;
categorizing, using the respective IEDs, the electrical, thermal, and/or mechanical data of the respective assets into the respective sub-systems of each of the respective assets;
providing, using the respective IEDs and using at least one communications network, the categorized electrical, thermal, and/or mechanical data of the respective assets;
identifying a first fault feature for a first sub-system of a first power system asset of the respective assets, wherein the first fault feature is influenced by load oscillations in the first power system asset;
comparing the first fault feature to a second fault feature of a second sub-system in a second power system asset of the respective assets, wherein the second fault feature is the same as the first fault feature, and wherein the second fault feature is not associated with load oscillations;

adjusting a threshold value based on the comparison of the first fault feature to the second fault feature of the second sub-system;

calculating, for a first sub-system of the first power system asset, a first value based on electrical, thermal, and/or mechanical data of the first power system asset included in the categorized electrical, thermal, and/or mechanical data of the respective assets;

calculating, based on the first value and using recent measurement data of the categorized electrical, thermal, and/or mechanical data of the respective assets, a first health index of the first sub-system;

calculating, using historical average data of the categorized electrical, thermal, and/or mechanical data of the respective assets, a first health score of the first sub-system;

determining, based on the first health index, the first health score, a second health index of a third sub-system of the first power system asset, a second health score of the third sub-system, and respective weightings of the first sub-system and the third sub-system, an overall health score of the first power system asset;

determining that the overall health score is greater than a threshold value; and generating a warning based on the determination that the overall health score is greater than the threshold value.

16. The non-transitory computer-readable medium of claim 15, wherein the second sub-system is a different type of sub-system than the first sub-system.

17. The non-transitory computer-readable medium of claim 15, wherein the computer-executable instructions further cause the processor to perform operations of:

calculating a weighted health index for the first sub-system based on a first weighted value calculated using the first health index and a second weighted value calculated using the health score, wherein the overall health score of the first power system asset is determined based on the weighted health index.

18. The non-transitory computer-readable medium of claim 15, wherein the first health index and the first health score are determined by comparing the recent measurement data and the historical average data to one or more threshold values.

19. The non-transitory computer-readable medium of claim 15, wherein the overall health score of the first power system asset is further weighted based on an asset criticality factor.

20. The non-transitory computer-readable medium of claim 15, wherein the historical average data includes short-term, mid-term, and long-term historical data.

* * * * *